(12) United States Patent
Kessler et al.

(10) Patent No.: US 12,188,168 B2
(45) Date of Patent: Jan. 7, 2025

(54) APPARATUS WITH A DISCHARGE MODULE AND SENSOR MODULE

(71) Applicant: Henkel AG & Co. KGaA, Duesseldorf (DE)

(72) Inventors: Arnd Kessler, Monheim am Rhein (DE); Lars Zuechner, Langenfeld (DE); Robert Ruiz Hernandez, Duesseldorf (DE); Ingo Hardacker, Hamminkeln (DE)

(73) Assignee: HENKEL AG & CO. KGAA, Duesseldorf (DE)

( * ) Notice: Subject to any disclaimer, the term of this patent is extended or adjusted under 35 U.S.C. 154(b) by 1122 days.

(21) Appl. No.: 16/966,165

(22) PCT Filed: Mar. 7, 2019

(86) PCT No.: PCT/EP2019/055748
§ 371 (c)(1),
(2) Date: Jul. 30, 2020

(87) PCT Pub. No.: WO2019/170822
PCT Pub. Date: Sep. 12, 2019

(65) Prior Publication Data
US 2021/0032793 A1 Feb. 4, 2021

(30) Foreign Application Priority Data

Mar. 7, 2018 (DE) ...................... 10 2018 203 586.5

(51) Int. Cl.
*D06F 39/02* (2006.01)
*D06F 33/37* (2020.01)
(Continued)

(52) U.S. Cl.
CPC ............ *D06F 39/024* (2013.01); *D06F 33/37* (2020.02); *D06F 34/05* (2020.02); *D06F 34/18* (2020.02);
(Continued)

(58) Field of Classification Search
CPC ... D06F 33/37; D06F 33/57; D06F 39/02–028
See application file for complete search history.

(56) References Cited

U.S. PATENT DOCUMENTS

2003/0182732 A1* 10/2003 Davenet .............. A47L 15/4463
68/17 R
2004/0088796 A1 5/2004 Neergaard et al.
(Continued)

FOREIGN PATENT DOCUMENTS

CN 101686793 A 3/2010
CN 102112035 A 6/2011
(Continued)

*Primary Examiner* — Spencer E. Bell
*Assistant Examiner* — Omair Chaudhri
(74) *Attorney, Agent, or Firm* — Lorenz & Kopf, LLP

(57) ABSTRACT

A device for use in a household appliance is disclosed. The device includes at least one casing configured to be placed in a treatment chamber of a household appliance. The casing includes at least one output module configured to dispense at least one preparation into the treatment chamber of the household appliance and/or to trigger an output and at least one sensor module configured to determine sensor data characteristic of the condition of the treatment chamber of the household appliance (300) and/or of the device. The sensor module includes at least one acceleration sensor, wherein the sensor data at least partially represents data determined by the at least one acceleration sensor. The dispensing and/or triggering of the output of the preparation by the at least one output module is based at least partially on the sensor data.

15 Claims, 6 Drawing Sheets

(51) Int. Cl.
   *D06F 34/05*   (2020.01)
   *D06F 34/18*   (2020.01)
   *D06F 34/22*   (2020.01)
   *D06F 103/02*  (2020.01)
   *D06F 105/42*  (2020.01)
   *H04L 67/12*   (2022.01)

(52) U.S. Cl.
   CPC .......... *D06F 34/22* (2020.02); *D06F 2103/02* (2020.02); *D06F 2105/42* (2020.02); *H04L 67/12* (2013.01)

(56) References Cited

U.S. PATENT DOCUMENTS

| | | | |
|---|---|---|---|
| 2007/0000068 A1 | 1/2007 | Gerard France | |
| 2011/0030150 A1* | 2/2011 | Ashrafzadeh | D06F 58/36 68/19 |
| 2012/0079664 A1* | 4/2012 | Civanelli | D06F 39/02 8/137 |
| 2013/0042652 A1 | 2/2013 | Brueckner et al. | |
| 2017/0048325 A1* | 2/2017 | Tincher | H04W 12/068 |
| 2018/0146835 A1* | 5/2018 | Alexander | A47L 15/006 |
| 2019/0264374 A1* | 8/2019 | Cooke | D06F 39/022 |

FOREIGN PATENT DOCUMENTS

| | | | | |
|---|---|---|---|---|
| CN | 104711823 A | * | 6/2015 | |
| CN | 105518548 A | | 4/2016 | |
| DE | 102009002693 A1 | | 1/2010 | |
| DE | 102008035910 A1 | * | 2/2010 | ............ D06F 33/02 |
| DE | 102010027993 A1 | | 5/2012 | |
| DE | 102014113252 A1 | * | 3/2016 | ............ D06F 33/02 |
| DE | 102016212979 A1 | | 1/2018 | |
| EP | 3150757 A1 | * | 4/2017 | ............ D06F 39/02 |
| KR | 20160039872 A | * | 4/2016 | |
| WO | WO-2011131256 A1 | * | 10/2011 | ......... A47L 15/4454 |
| WO | WO-2011134690 A1 | * | 11/2011 | ......... A47L 15/0055 |
| WO | 2017067936 A1 | | 4/2017 | |
| WO | 2017167658 A1 | | 10/2017 | |

* cited by examiner

Peaks (Example)
Threshold Value

Rotating Phase e.g. 35s
Interval Phase e.g. 4s

APPARATUS WITH A DISCHARGE MODULE AND SENSOR MODULE

CROSS-REFERENCE TO RELATED APPLICATION

This application is a U.S. National-Stage entry under 35 U.S.C. § 371 based on International Application No. PCT/EP2019/055748, filed Mar. 7, 2019, which was published under PCT Article 21(2) and which claims priority to German Application No. 10 2018 203 586.5, filed Mar. 9, 2018, which are all hereby incorporated in their entirety by reference.

TECHNICAL FIELD

The present disclosure relates to a device for use in a domestic appliance, the device comprising at least one output module and at least one sensor module.

BACKGROUND

Devices and methods for controlling and/or regulating household appliances such as washing machines or tumble dryers are known from the state of the art. The aim in operating such household appliances is typically to achieve a high degree of user-friendliness and at the same time the best possible result (in the case of a washing machine, in particular, the most immaculate cleaning result possible).

If, for example, increased soiling is to be taken into account, a user must take this into account manually, for example, and select an appropriate program or detergent. Approaches are known in which parameters of the household appliance are automatically adjusted in order to achieve the best possible result. For example, parameters of the household appliance are configured to parameters defined by the detergent used. For example, the washing program of a washing machine is configured to the detergent used.

The disadvantage is that in many situations and scenarios the result to be achieved is still in need of improvement.

SUMMARY

Against the background of the state of the art as presented, the task of the present disclosure is to variably improve the result to be achieved with a household appliance with respect to the many possible situations and scenarios and to ensure the highest possible reliability of the devices used.

According to a first aspect of the present disclosure, a device for use in a household appliance is disclosed, the device comprising:
 at least one casing,
  wherein the casing is adapted to be placed in a treatment chamber of a household appliance;
  wherein the casing comprises:
   at least one output module adapted to dispense at least one preparation into the treatment chamber of the household appliance and/or trigger an output; and
   at least one sensor module adapted to determine sensor data characteristic of the condition of the treatment chamber of the household appliance and/or the device;
  wherein said sensor module comprises at least one acceleration sensor, wherein said sensor data at least partially represents data determined by said at least one acceleration sensor; and
  wherein the dispensing and/or triggering of the output of the preparation by the at least one output module is at least partially based on the sensor data.

For the purposes of the present disclosure, "household appliance" refers to household appliances for textile treatment, in particular textile washing machines, tumble dryers or ironing machines. Dishwashing appliances, such as dishwashers, are not household appliances within the meaning of the present disclosure.

According to a second aspect of the present disclosure, a device for use in a household appliance is disclosed, the device comprising: at least one casing, the casing being configured to be placed in a treatment chamber of a household appliance; the casing comprising: at least one sensor module configured to determine sensor data characteristic of the condition of the treatment chamber of the household appliance and/or the device; wherein the sensor module includes at least one acceleration sensor, wherein the sensor data at least partially represents data determined by the at least one acceleration sensor; and wherein the dispensing and/or triggering of the output of the preparation by the at least one output module is based at least partially on the sensor data.

According to the first and/or second aspect of the present disclosure, a device is disclosed for use in a household appliance, said device comprising: at least one casing, said casing being adapted to be placed in a treatment chamber of a household appliance; said casing comprising: at least one sensor information; and at least one sensor information representing data detected by said at least one sensor: at least one output module adapted to dispense at least one preparation into the treatment chamber of the household appliance and/or to initiate output; and/or at least one sensor module configured to determine sensor data characteristic of the condition of the treatment chamber of the household appliance and/or of the device; wherein the sensor module comprises at least one acceleration sensor, wherein the sensor data at least partially represents data determined by the at least one acceleration sensor; and wherein the dispensing and/or initiation of the output of the preparation by the at least one output module is based at least partially on the sensor data.

The device according to the first aspect of the present disclosure is, for example, a dosing device for dispensing a preparation comprising treatment agents, fragrances, detergents and/or cleaning agents. The device according to the second aspect of the present disclosure is, for example, a sensor device for detecting sensor data relating to the treatment process (e.g. cleaning program) in the household appliance. The acceleration sensor, for example, acquires data indicative of a movement, such as a speed and/or an acceleration, to name but a few non-limiting examples. The device according to the first and second aspect is, for example, a dosing device in combination with a sensor device comprising an acceleration sensor, especially in a common casing.

According to the first aspect of the present disclosure, a method using one or more devices according to the first aspect is further disclosed, the method comprising the steps of: acquiring and/or obtaining output data (e.g. comprising the sensor data) at the output module; and determining and/or causing the determination of output control data at least partially dependent on the output data, the output control data being in particular representative of at least one property of a storage container for a preparation, an application specification for a preparation contained in the storage container and/or a property of a preparation contained in the storage container, the output control data being adapted to at least partially control the output of the preparation by the output module.

According to the second aspect of the present disclosure, a method using one or more devices according to the second aspect is further disclosed, the method comprising the steps of: detecting and/or obtaining at the sensor module sensor data characteristic of the condition of a treatment chamber of the household appliance; determining and/or causing the determination of output data at least partially dependent on the sensor data; and outputting and/or triggering the output of the output data.

According to the first and second aspects of the present disclosure, a method using one or more devices according to the first aspect and one or more devices according to the second aspect is further disclosed.

According to a third aspect of the present disclosure, a system comprising a device according to the first and/or second aspect of the present disclosure is disclosed, the system further comprising at least one household appliance, for example a washing machine or a tumble dryer. The system according to the third aspect may comprise further devices and/or features, for example a communication network and/or a server.

The device according to the first and/or second aspect and the system according to the third aspect of the present disclosure may comprise hardware and/or software components. The hardware and/or software components may, for example, comprise at least one memory containing program instructions of a computer program and at least one processor configured to execute program instructions from the at least one memory. Accordingly, according to the first and second aspect of the present disclosure, also a device comprising at least one processor and at least one memory with program instructions shall be understood as disclosed, wherein the at least one memory and the program instructions are adapted to cause, together with the at least one processor, the output module and the sensor module, respectively, to execute and/or control the method according to the first aspect and the second aspect of the present disclosure, respectively.

Alternatively or in addition, the device according to the first and/or second aspect may further comprise one or more further sensors and/or one or more communication interfaces.

A communication interface should be understood to mean, for example, a wireless communication interface and/or a wired communication interface.

A wireless communication interface is, for example, a communication interface according to a wireless communication technology. An example for a wireless communication technology is a local radio network technology such as Radio Frequency Identification (RFID) and/or Near Field Communication (NFC) and/or Bluetooth (e.g. Bluetooth Version 2.1 and/or 4.0) and/or Wireless Local Area Network (WLAN). RFID and NFC, for example, are specified according to ISO standards 18000, 11784/11785 and ISO/IEC standards 14443-A and 15693. WLAN, for example, is specified in the standards of the IEEE 802.11 family Another example of a wireless communication technology is a supra-local radio network technology such as a mobile radio technology, for example Global System for Mobile Communications (GSM) and/or Universal Mobile Telecommunications System (UMTS) and/or Long Term Evolution (LTE). GSM, UMTS and LTE specifications are maintained and developed by 3rd Generation Partnership Project (3GPP).

A wired communication interface is, for example, a communication interface according to a wired communication technology. Examples of a wired communication technology are a Local Area Network (LAN) and/or a bus system, for example a Controller Area Network bus (CAN bus) and/or a Universal Serial Bus (USB). CAN bus, for example, is specified according to ISO standard ISO 11898. LAN, for example, is specified in the standards of the IEEE 802.3 family. It is understood that the output module and/or the sensor module may also include other features not listed.

Furthermore, according to the first, second and/or third aspect of the present disclosure, a computer program is disclosed comprising program instructions adapted to cause a device to execute and/or control the method according to the first and/or second aspect or the system according to the third aspect when the computer program is executed by a processor.

Furthermore, a computer-readable storage medium containing a computer program according to the first, second and/or third aspect of the present disclosure is disclosed. A computer-readable storage medium may, for example, be in the form of a magnetic, electrical, electro-magnetic, optical and/or other type of storage medium. Such computer-readable storage medium is preferably tangible (i.e. "touchable"), for example, it is designed as a data storage device. Such a data storage device is, for example, portable or permanently installed in a device. Examples of such data storage devices are volatile or non-volatile Random Access Memories (RAM) such as NOR flash memories or sequential access memories such as NAND flash memories and/or Read-Only Memories (ROM) or read-write memories. Computer-readable shall be understood to mean, for example, that the storage medium may be read and/or written by a computer or server device, such as a processor.

In the following, the features of the devices and methods according to the first and second aspect or the system according to the third aspect of the present disclosure are described, some of them as examples.

A household appliance is understood to be in particular a washing machine, in particular also a (laundry) dryer and/or an ironing device. Corresponding household appliances may have a treatment chamber which is equipped to receive objects such as textiles and to subject them to a treatment inside the treatment chamber, for example cleaning, drying and/or ironing.

The casing is designed to be placed in a treatment chamber of a household appliance and has, in particular, an appropriate size which allows the casing or device to be removed at least partially from the treatment chamber. In particular, the casing or device may be placed loosely and/or without fasteners in the treatment chamber. In the case of a washing machine or dryer, for example, the casing or device is to be placed in and/or removed from the treatment chamber together with the objects to be cleaned. The casing of the device encloses in particular some or all of the features of the device partially or completely. In particular, the casing is designed to be watertight so that some or all of the features of the device do not come into contact with water when the device is placed in a treatment chamber, for example, the treatment chamber of a washing machine, and in particular during a treatment.

The device or casing referred to in the first and/or second aspect is in particular a mobile and/or portable device and/or a device distinct from the household appliance. A mobile and/or portable device shall be understood to mean, for example, a device whose external dimensions are less than about 30 cm×30 cm×30 cm, preferably less than about 15 cm×15 cm×15 cm. A device other than a household appliance is for example a device which has no functional connection with the household appliance and/or is not a part permanently connected to the household appliance. For example, a device which is mobile and/or portable and different from a household appliance is a device which is placed (e.g. inserted) by a user in the washing and/or cleaning area of the household appliance (e.g. the washing drum of a washing machine) for the duration of a treatment process (e.g. cleaning program). An example of such a mobile and/or portable device as well as a device other than a household appliance is a dosing device and/or sensor device which is placed in the washing drum of a washing machine before the start of the washing process. For example, the output module and/or sensor module is part of such a dosing device and/or sensor device according to the first and/or second aspect of the present disclosure.

The casing may have at least one output module which is designed to dispense at least one preparation into the treatment chamber of the household appliance and/or to trigger an output. The output of a preparation, for example, comprising detergent and/or cleaning agents, is to be understood, for example, as meaning that the preparation is output to the environment of the output module and/or a storage container for the preparation. The output is carried out, for example, by the output module. Alternatively or additionally, output may be affected by the output module, e.g. the output module causes the preparation to be output through the storage container. For example, the output module causes the preparation to be output through an output opening of the output module and/or the storage container to the environment of the output module and/or the storage container.

The casing has at least one sensor module which is configured to determine at least one piece of sensor data characteristic of the condition of the treatment chamber of the household appliance and/or the device. Such sensor data may, for example, be at least one parameter of a movement (in particular speed and/or acceleration, in particular of the device and/or the casing and/or the treatment chamber), conductivity (for example of a substance in the treatment chamber such as water and/or a washing or cleaning solution or liquor) and/or temperature, for example the temperature in the treatment chamber and/or the temperature of a substance in the treatment chamber such as water. Accordingly, the sensor module may comprise one or more sensors which are configured to acquire characteristic sensor data, for example, an acceleration sensor (accelerometer), a conductivity sensor and/or a temperature sensor (for example a thermocouple). A sensor is further understood to be, for example, a mechanical sensor (e.g. a pressure sensor) and/or an optical sensor (e.g. a CCD sensor). In addition to an optical sensor, the sensor module may also include a light generating feature configured to generate light in the visible and/or non-visible range. An example of a light generating feature is a Light Emitting Diode (LED).

An acceleration sensor is a sensor that measures its acceleration. This is done, for example, by determining the inertial force acting on a mass of the acceleration sensor. Thus it may be determined, for example, whether there is an increase or decrease in speed.

An acceleration sensor may, for example, represent a motion sensor. Such a motion sensor may, for example, detect a change in position. For example, movement may be detected by employing an acceleration sensor in such a way that movements are calculated as an integration of data (e.g. measured values) acquired by an acceleration sensor. For example, the position of the device may be determined in the treatment chamber of the household appliance.

The data acquired by the acceleration sensor represents, for example, an acceleration and/or movement of the device. Furthermore, the data acquired by the acceleration sensor represents, for example, a certain position of the device.

The sensor data represents at least partially the data detected by the at least one acceleration sensor. For example, the sensor data comprises the data determined by the at least one acceleration sensor. The sensor data may, accordingly, in particular comprise further data, for example, data acquired by further one or more sensors (e.g. temperature sensor, optical sensor, conductivity sensor, or a combination thereof, to name only a few non-limiting examples) acquired by the sensor module.

Dispensing and/or triggering the output of the preparation by the at least one output module is at least partially based on the sensor data. If the data acquired by the acceleration sensor represents, for example, a movement of the treatment chamber, for example, in a washing machine, dispensing and/or triggering of the output of the preparation may, for example, be prevented until there is no movement of the treatment chamber. Further possible scenarios are, for example, that a movement of the device has been detected based on the data acquired by the acceleration sensor, but not, for example, a further rotation of the device relative to the movement of the treatment chamber, e.g. in a washing machine. This may, for example, indicate that the device is wrapped in a load (e.g. laundry) inside the treatment chamber of the washing machine. Similarly, dispensing and/or triggering the output of the preparation may also be prevented until the device is no longer wrapped, for example, because this allows, in particular, improved dispensing and/or triggering of the output of the preparation.

An embodiment according to all aspects of the present disclosure provides that the data determined by the acceleration sensor is at least partially indicative of a load condition of the treatment chamber in the household appliance.

The data determined by the acceleration sensor is at least partially indicative of a load condition of the household appliance. For example, the data acquired by the acceleration sensor represents whether or not the treatment chamber of the household appliance is loaded. In addition, the data determined by the acceleration sensor may represent how full (e.g. as a percentage of the maximum possible capacity) the treatment chamber of the household appliance is loaded (or filled).

If the data determined by the acceleration sensor shows a relatively frequent movement of the appliance (e.g. little movement within a time interval, e.g. of about 5 seconds; e.g. more than one movement per second), it may be concluded, for example, that the treatment chamber of the household appliance has a correspondingly small load. For example, if the data acquired by the acceleration sensor shows a relatively infrequent movement of the device (e.g. only one movement per second), it may be concluded that the treatment chamber of the household appliance is fully loaded. For example, in training cases, there may be a lightly loaded and a fully loaded treatment chamber, and the acceleration sensor may be used to acquire corresponding data characterizing the respective condition. These may, for example, be stored as reference values in a database. Furthermore, depending on the condition of the treatment chamber, recommendations may be defined in the database of the household appliance for dispensing and/or triggering the output of preparation into the treatment chamber, which guarantee a particularly reliable cleaning result. In addition or alternatively, depending, for example, on the condition of the treatment chamber of the household appliance, recommendations for the cleaning program to be carried out by the household appliance may also be included in the database. The data stored in the database or included in the database may be used, for example, to control and/or regulate both the device and the household appliance.

In an embodiment according to all aspects of the present disclosure, the data determined by the acceleration sensor is at least partially indicative of a status of a cleaning program to be carried out by the household appliance.

The status of the cleaning program performed by the household appliance represents, for example, an identification of that status of the cleaning program which corresponds, for example, to the current and performed step of the cleaning program by the appliance. This may be carried out at least partially based on the data acquired by the acceleration sensor or on several items of data acquired by the acceleration sensor, reflecting or comprising one or more parameters characterizing the condition of the treatment chamber of the household appliance. A parameter characterizing the condition of the treatment chamber of the household appliance further represents, for example, a temperature, a liquid level (e.g. water), a number of revolutions of the treatment chamber of a household appliance designed as a washing machine, just to name a few non-limiting examples.

At least partly based on the determined status of the cleaning program carried out by the household appliance, it is possible, for example, to control and/or regulate the device or to determine a possible control and/or regulation of the device intended to be carried out. For example, a control and/or regulation of the device may be carried out or a possible control and/or regulation of the device intended to be carried out may be determined, at which point in time (date, time, step of the cleaning program, or the like) a dispensing or triggering of an output of the at least one preparation (e.g. cleaning agent), a consideration of the nature and/or type (e g manufacturer and appliance identification number) of the household appliance, and/or whether or not a dispensing or triggering of an output of the at least one preparation (e.g. cleaning agent) should take place when a step of the cleaning program (e.g. rotating of the treatment chamber in a household appliance designed as a washing machine) should take place or not.

For this purpose, a query may be made, for example, to the database, in which, for example, relevant historical data is stored. On the basis of this historical data, the control and/or regulation of the device may be carried out or a possible control and/or regulation of the device intended to be carried out may be determined. The use of historical data may in particular be combined with the use of an artificial neural network. Further details on the use of an artificial neural network are described below.

For example, according to the first and/or the second aspect of the present disclosure, the method comprises acquiring and/or obtaining at the sensor module sensor data characteristic of the condition of a treatment chamber of the household appliance, and determining and/or effecting the determination of output data at least partially dependent on the sensor data. The sensor data also represents, for example, measured values of one or more physical and/or chemical variables which are characteristic of the condition of the treatment chamber and/or the device, for example of the washing and/or cleaning process, such as a temperature of the washing and/or cleaning liquor, a duration of the washing and/or cleaning process and/or a concentration of washing and/or cleaning agents in the washing and/or cleaning liquor.

In a further embodiment according to all aspects of the present disclosure, the data determined by the acceleration sensor is at least partially indicative of a movement of the device.

A movement of the device is exemplified by a movement of the device comprising one or more degrees of freedom, by a movement path, or a combination thereof. For example, the one or more degrees of freedom and/or the movement path may represent a distance covered by the device. For example, the greater the distance traveled, the more likely it is that the household appliance will have a smaller load. The further the distance traveled, the more likely it is, for example, that the household appliance will have a lower load, which is possible because the appliance moves more with a smaller load, for example in a treatment chamber of a washing machine, or the movement of the appliance is less restricted by laundry in the treatment chamber of the washing machine.

In a further embodiment according to all aspects of the present disclosure, the data determined by the acceleration sensor at least partially represents a curve of a measured acceleration over a predetermined time, in particular the data determined by the acceleration sensor represents the depicted curve of a measured acceleration over a predetermined time.

The course of the curve, for example, represents a harmonic and/or a disharmonic sine wave. The course of the curve represents, for example, a harmonic and a disharmonic sine oscillation, for example by representing a harmonic sine oscillation over a first period of time, and a disharmonic oscillation over a second period of time following (directly) the first period of time.

In particular, the device is configured in such a way that the load condition of the treatment chamber is determined by analyzing the depicted curve. A harmonic sinusoidal oscillation in the depicted curve is recognized as indicative of a fully loaded drum, and a disharmonic sinusoidal oscillation in the depicted curve is recognized as indicative of a partially loaded drum.

An embodiment according to all aspects of the present disclosure provides that the output module and/or the sensor module are configured to communicate with the household appliance, in particular to communicate wirelessly with the household appliance.

A further embodiment according to all aspects of the present disclosure provides that the output module and/or the sensor module are configured to perform and/or prevent communication with the household appliance at least based on the sensor data acquired by the sensor module.

The output module and/or the sensor module, which are adapted to communicate with the household appliance, may, for example, communicate with the household appliance by the communication interface covered by the device. The communication interface is in particular designed to communicate wirelessly with the household appliance. The output module may also be configured to communicate with the sensor module, in particular wirelessly.

In a further embodiment of the device according to the first and/or second aspect, the output module and/or the sensor module is set up to carry out and/or prevent communication with the household appliance at least based on the sensor data acquired by the sensor module.

In an embodiment according to all aspects of the present disclosure, the communication with the household appliance comprises a transmission of feedback data, wherein the feedback data is indicative of a feedback to the household appliance with respect to at least one parameter characterizing the treatment chamber of the household appliance.

The feedback data comprises or represents for example one or more of the following parameters i) to iii):
  i) data indicative of a mechanical condition of the appliance;
  ii) data indicative of a load condition of the treatment chamber of the household appliance; and
  iii) data indicative of a recommendation of a cleaning program to be carried out or of a modification of a program carried out on the household appliance.

The feedback data may be used to control and/or regulate, for example, the dispensing of at least one preparation into the treatment chamber of the household appliance or to trigger such output. This may be done, for example, in such a way that the household appliance takes the feedback data into account. For example, such a cleaning program of the household appliance may be selected, or an already selected cleaning program of the household appliance may be adapted, which takes into account the load condition of the treatment chamber. For example, a cleaning program that carries out particularly intensive cleaning may be selected if, for example, the treatment chamber is particularly fully loaded.

Alternatively or in addition, a recommendation for a cleaning program to be carried out may be given, for example, via a display device on the household appliance, or to a display or comprehensive electronic device (e.g. a mobile device such as a smartphone, tablet, or wearable, to name but a few non-limiting examples). On the basis of the output, a user may, for example, manually select an appropriate cleaning program or change an already selected cleaning program (e.g., change the temperature, duration, or other special parameters (e.g., spin speed of a washing machine-type household appliance, to name a few non-limiting examples)). This makes it possible in particular to use the device with household appliances that cannot be controlled and/or regulated automatically.

The feedback data may, for example, also cause the household appliance to be controlled and/or regulated, such as switching the household appliance on and/or off. With regard to switching the household appliance on and/or off, it may, for example, influence whether (at all) the household appliance is switched on and/or off and/or at what time (time, date, or e.g. immediately) the household appliance is switched on and/or off. For example, the feedback data based on the specific sensor data may cause such a feedback to the household appliance that the household appliance knows that, for example, the treatment chamber of the household appliance is fully (or almost fully) loaded. In addition, the feedback data may additionally provide the household appliance with data on the nature of the load (e.g. laundry, color of the laundry, or a combination thereof, to name but a few non-limiting examples), so that it is possible to influence the selection, composition and/or dosing of a cleaning program to be carried out by the household appliance and/or a cleaning agent to be used for the household appliance. For example, the amount to be dosed (e.g. the amount of detergent in a washing machine), the time of dosing, the product to be dosed, or individual ingredients (e.g. soil release polymers, bleaches, enzymes, hygiene rinse aids in a washing machine, to name but a few non-limiting examples) or combinations thereof may be influenced. The compatibility of combinations of ingredients may also be taken into account, for example to avoid incompatibility (such as bleaching agents and enzymes).

Influencing the operating mode of the household appliance may, for example, include selecting a specific (e.g. pre-programmed) program, running additional programs, influencing the program time (e.g. lengthening or shortening), changing individual parameters of the cleaning program (in the case of a washing machine, for example, the temperature, spin speed, or similar).

In addition or alternatively, it is possible not only to control and/or regulate the household appliance (automatically), taking into account in particular the data acquired by the acceleration sensor, but also to give the user a recommendation. For example, it is possible that in addition to an automated adjustment of the household appliance, manual pre-treatment (of clothing, for example) may also be necessary. Such a recommendation may be indicated or communicated to the user, for example, by a display device as described above.

In a further embodiment according to all aspects of the present disclosure, the output module and/or the sensor module are configured to carry out communication with at least one server, whereby the communication may be used in particular for transmitting feedback data (e.g. indicative of a status of the device, such as mechanical condition and/or a cleaning program carried out by the household appliance).

The at least one server is, for example, a remote server. This at least one remote server is, for example, connected to a communication network (e.g. the Internet). The output module and/or the sensor module, for example, may communicate with the server via this communication network. The communication between the output module and/or the sensor module and the at least one server is in particular bidirectional communication. To enable communication with the server, the communication interface of the device is configured, for example, to establish a connection with this communication network (e.g. the Internet).

An embodiment according to all aspects of the present disclosure provides that a user profile may be generated at least partially based on the feedback data, whereby the user profile comprises one or more data specifying the user.

The one or more data specifying the user is indicative for one or more of the following parameters i) to ix), for example:
  i) one or more items of data relating to the cleaning products used by the user;
  ii) one or more items of data concerning the extent (frequency, regularity, rate or the like) of the user's use of the household appliance;
  iii) one or more items of data concerning the quantity of each load during a cleaning operation of the user's household appliance;
  iv) one or more items of data concerning the time (date, time, day of the week) of use of the household appliance by the user;
  v) one or more items of data concerning the quantity of detergent used;
  vi) one or more items of data concerning the type of cleaning program chosen by the user of the household appliance;
  vii) one or more items of data concerning a recommendation to the user on the detergent to be used;
  viii) one or more items of data concerning the energy costs incurred by the use of the household appliance; and ix) one or more items of data concerning an optimization of a cleaning strategy to achieve an improved cleaning result.

A further embodiment according to all aspects of the present disclosure stipulates that it is determinable, at least partially based on the sensor data, whether or not the device is configured in the treatment chamber of the household appliance, whereby in particular the determination may be carried out by an artificial neural network.

For example, the sensor data may be communicated (e.g. transmitted) to a server which comprises an artificial neural network or is connected to it. Determining whether or not the device is located in a treatment chamber of the household appliance may subsequently be performed, for example, by the artificial neural network. The result may then be communicated to the device and/or, for example, the household appliance.

The artificial neural network includes, for example, an evaluation algorithm, so that, for example, training cases may be learned from as examples and, after completion of the learning phase, these may be generalized as a basis for determining a result. This means that the examples are not simply learned by heart, but patterns and regularities in the learning data are recognized. Different approaches may be followed for this purpose. For example, supervised learning, partially supervised learning, unsupervised learning, reinforced learning and/or active learning may be used. Supervised learning may, for example, be carried out using an artificial neural network (e.g. a recurrent neural network) or a support vector machine. Unsupervised learning may also be carried out by an artificial neural network (e.g. an auto encoder). The learning data are, for example, sensor data received several times or the output variables (or results) of the artificial neural network determined after one run.

It is also possible that the repeated receipt and/or determination of sensor data or output variables are used for machine learning. Thus, for example, the user profile or one or more items of data included in the user profile may be determined at least partially based on machine learning.

These measures may increase the reliability of the determination of an open-loop and/or closed-loop control of the device and/or the household appliance and subsequently in particular the treatment by the household appliance, in particular for the removal of soiling.

Each of the training cases may be given by an input vector, sensor data and an output vector of the artificial neural network.

Each training case of the training cases may, for example, be generated by converting the control and/or regulation of the device and/or the household appliance associated with the training case, as well as the dispensing or triggering of the output of a preparation into the treatment chamber of the household appliance into a predetermined state (e.g. defined soiling in the treatment chamber of the household appliance), and subsequently generating sensor data representative of sensor data characteristic of the condition of the treatment chamber, and simultaneously carrying out an analysis of the condition of the treatment chamber of the household appliance, e.g. manually. The determined sensor data is transmitted as an input vector, the (actual) condition of the treatment chamber of the household appliance as an output vector of the training case.

In an embodiment incorporating all aspects of the present disclosure, the temperature range envisaged for the treatment chamber of the household appliance during a treatment is from about 20° C. to about 150° C., in particular from about 20° C. to about 75° C. or from about 30° C. to about 60° C.

In a further embodiment of the device according to the first and/or second aspect, the output module is designed to carry out and/or prevent the dispensing and/or effecting of the output of a preparation by the output module at least based on the sensor data acquired by the sensor module.

It is also possible to detect and/or obtain storage container data. The detection of storage container data (of the preparation stored by the device) is to be understood, for example, as meaning that storage container data is acquired by the output module or by the output module. For example, the detection of the storage container data may be based on sensor data.

For example, obtaining the storage container data is to be understood as receiving and/or reading of the storage container data by the output module or a communication interface of the output module.

The storage container data represents, for example, a characteristic property of the storage container. By storage container data which is characteristic of a property of a storage container is meant, for example, data which represents and/or contains one or more details about a maximum date of use of the storage container, about the spatial configuration of the storage container, about a volume and/or a filling quantity of the storage container and/or for identifying the storage container or the type of storage container.

Furthermore, the storage container data may represent an application specification for a preparation contained in the storage container. For example, such application specification may contain and/or represent one or more indications of a recommended dosage of the preparation for a particular application. Alternatively or in addition, storage container data which represents an application specification for a preparation contained in the storage container should also be understood to mean data which identifies the output control data and/or at least partially represents and/or contains the output control data.

Alternatively or additionally, the storage container data represents a property of a preparation contained in the storage container, such as washing and/or cleaning agents. Such storage container data, which is characteristic of a property of a preparation contained in a storage container, is to be understood, for example, as data which represents and/or contains one or more indications of a chemical and/or physical property of the preparation, of the type of preparation and/or for identification of the preparation. By a chemical and/or physical property is meant, for example, a chemical and/or physical composition of the preparation and/or the physical condition of the preparation (e.g. solid, liquid or gaseous). For example, the storage container data represents values of one or more physical and/or chemical quantities (e.g. one or more values of physical and/or chemical quantities describing one or more properties of the preparation). An indication of a type of preparation comprising a detergent and/or cleaning agent indicates for example whether it is a heavy-duty detergent, a mild detergent, a coloreds detergent, disinfectant and/or another type of detergent and/or cleaning agent and/or which ingredients and/or builder composition the detergent and/or cleaning agent has. An example of an indication for the identification of the preparation is, for example, an identifier for the identification of the preparation such as a product name and/or a product number.

The device further includes, for example, a storage container. Such a storage container is configured, for example, to contain a preparation (e.g. a certain amount of a detergent and/or cleaning agent). For example, the storage container has one or more storage compartments to hold the preparation. If the storage container has several storage compartments, each of the storage compartments may, for example, contain a different preparation such as a different detergent and/or cleaning product and/or a different mixture of detergents and/or cleaning agents. For example, the storage container may have a specific spatial shape (e.g. cube-shaped, spherical and/or plate-like). For example, the storage container may be at least partially dimensionally stable. Alternatively or additionally, the storage container may, for example, be at least partially flexible, for example as a flexible packaging material (e.g. as a tube and/or a bag). It is understood that the storage container may also be designed as an at least partially flexible container surrounded by an at least partially dimensionally stable receptacle, for example as a bag in a substantially dimensionally stable frame.

The preparation, in particular a washing and/or cleaning agent is contained in the storage container, for example in solid, liquid and/or gaseous form. For example, the preparation is a pure substance and/or a mixture of substances. A solid preparation, such as a detergent and/or cleaning agent, may be contained in the storage container, for example in powder, tablet and/or tab form. A liquid preparation may, for example, be contained in the storage container as a gel, concentrated and/or diluted solution. It is understood that the preparation may also be contained in the storage container as foam, rigid foam, emulsion, suspension and/or aerosol. Non-limiting examples of preparations or detergents and/or cleaning agents and/or their ingredients are one or more components from a group of components comprising surfactants, alkalis, builders, graying inhibitors, optical brighteners, enzymes, bleaching agents, soil release polymers, fillers, plasticizers, fragrances, dyes, care substances, acids, starch, isomalt, sugar, cellulose, cellulose derivatives, carboxymethyl cellulose, polyetherimide, silicone derivatives and/or polymethylimines Other non-exhaustive examples of exemplary ingredients are bleach activators, complexing agents, builders, electrolytes, non-aqueous solvents, pH-adjusting agents, perfume carriers, fluorescent agents, hydrotropes, silicone oils, bentonites, anti-redeposition agents, anti-shrinking agents, anti-crease agents, color transfer inhibitors, antimicrobial agents, germicides, fungicides, antioxidants, preservatives, corrosion inhibitors, anti-static agents, bittering agents, ironing aids, phobic or impregnating agents, swelling or slipping agents and/or UV absorbers.

The storage container is, for example, connected and/or connectable to the output module. Preferably the storage container is detachably connected and/or detachably connectable to the output module. A detachable connection is, for example, a connection in which the storage container and the output module may be connected and disconnected non-destructively. For example, more than one storage container is simultaneously connected and/or connectable to the output module. For example, the storage container may be mechanically connected and/or connectable to the output module. For example, the output module and the storage container have corresponding connection features for establishing a connection between the storage container and the output module. The connection may be positive, for example, in the form of a locking mechanism. Alternatively or additionally, the connection may be non-positive, for example in the form of a screw and/or Velcro connection. Alternatively or additionally, the connection may be a material-locking connection, for example in the form of an adhesive connection.

Furthermore, the connection between the storage container and the output module may be used to transport the preparation from the storage container to the output module. For example, the connection features are designed to provide a liquid-tight, vapor-tight and/or gas-tight connection for transporting the preparation from the storage container to the output module. Examples of connecting features for making such a connection are a tube (e.g. a tube of the storage container) and a membrane (e.g. a membrane of the output module) and/or Luer connectors and/or Luer couplings.

If more than one storage container is simultaneously connected and/or connectable to the output module, the storage containers may alternatively or additionally also be connected and/or connectable to each other. For example, at least those storage containers that are connected to the output module may also be connected and/or connectable to each other.

For example, the output control data specifies one or more output parameters. Examples of an output parameter are an output quantity, an output time, output temperature and/or output duration. For example, an output parameter specifies an output quantity, an output time, output temperature and/or output duration for output. The fact that the output control data is configured to at least partially control the output by the output module is to be understood, for example, as meaning that the output control data causes the output module to output the preparation according to the output parameters specified by the output control data.

Determining the output control data at least partially dependent on the storage container data is to be understood, for example, as meaning that the output control data is selected and/or calculated at least partially dependent on the storage container data. For example, the output control data is determined by the output module, the sensor module and/or a further device (for example a server device). For example, the determination of the output control data is at least partially based on the sensor data.

Accordingly, effecting the determination of the output control data shall be understood to mean, for example, that the output module causes the output control data to be determined by a device other than the output module (e.g., a server device). For example, the storage container data is sent by the output module to the server device to cause the server device to determine the output control data.

As disclosed above, the output control data may specify one or more output parameters. For example, the output module is configured to output the preparation contained in the storage container according to the output parameters specified by the output control data and/or to cause the output of the preparation contained in the storage container (e.g., by the storage container) according to the output parameters specified by the output control data when the storage container is connected to the output module.

For example, the output module comprises a control unit and at least one actuator, wherein the control unit is configured to control the actuator. For example, the control unit is configured to control the actuator in such a way that a movement of the actuator is affected. For example, the movement of the actuator causes a preparation to be dispensed. For example, the control unit is configured to control the actuator in such a way that the preparation is dispensed in accordance with the output parameters specified by the output control data and/or the output of the preparation contained in the storage container (e.g. by the storage container) is effected in accordance with the output parameters specified by the output control data.

An actuator is to be understood as a movable component of the output module. For example, the actuator is configured in such a way that, when it moves and the storage container is connected to the output module, it causes the preparation to be dispensed. Examples of an actuator are a pump (e.g. a peristaltic pump), a valve and/or a motor (e.g. a linear motor). If the actuator is a pump, the control unit controls the pump for outputting the preparation, for example, in such a way that the pump transports the preparation from the storage container to an output opening (e.g. an output opening of the storage container and/or the output module). If the actuator is a valve, the valve is configured, for example, to close an output opening (e.g. an output opening of the storage container and/or the output module). To output the preparation, the control unit controls the valve, for example, so that the valve opens so that the preparation may flow out of the output opening.

Furthermore, a use of an acceleration sensor in a dosing device and/or a sensor device, in particular a device according to the first aspect of the present disclosure for a household appliance is disclosed, wherein an acceleration sensor is configured to determine sensor data characteristic for the condition of the treatment chamber of the household appliance and/or the device, and wherein the sensor data at least partially represents data determined by the at least one acceleration sensor. The acceleration sensor or the device comprising the acceleration sensor may be designed according to individual or several features described above.

In particular, the previous or following description of method steps according to preferred embodiments of a method should also reveal corresponding features for carrying out the method steps by preferred embodiments of a device. Likewise, by the disclosure of employing a device for performing a method step, the corresponding method step shall also be disclosed.

Further advantageous exemplary embodiments of the present disclosure are shown in the following detailed description of some exemplary embodiments of the present disclosure, especially in connection with the Figures. The Figures, however, are only intended to clarify, but not to determine the scope of protection of the present disclosure. The Figures are not to scale and are merely intended to illustrate the general concept of the present disclosure. In particular, features included in the Figures are not intended to be considered as a necessary element of the present disclosure.

BRIEF DESCRIPTION OF THE DRAWINGS

The present disclosure will hereinafter be described in conjunction with the following drawing figures, wherein like numerals denote like elements, and.

DETAILED DESCRIPTION

The following detailed description is merely exemplary in nature and is not intended to limit the disclosure or the application and uses of the subject matter as described herein. Furthermore, there is no intention to be bound by any theory presented in the preceding background or the following detailed description.

Figure 1:
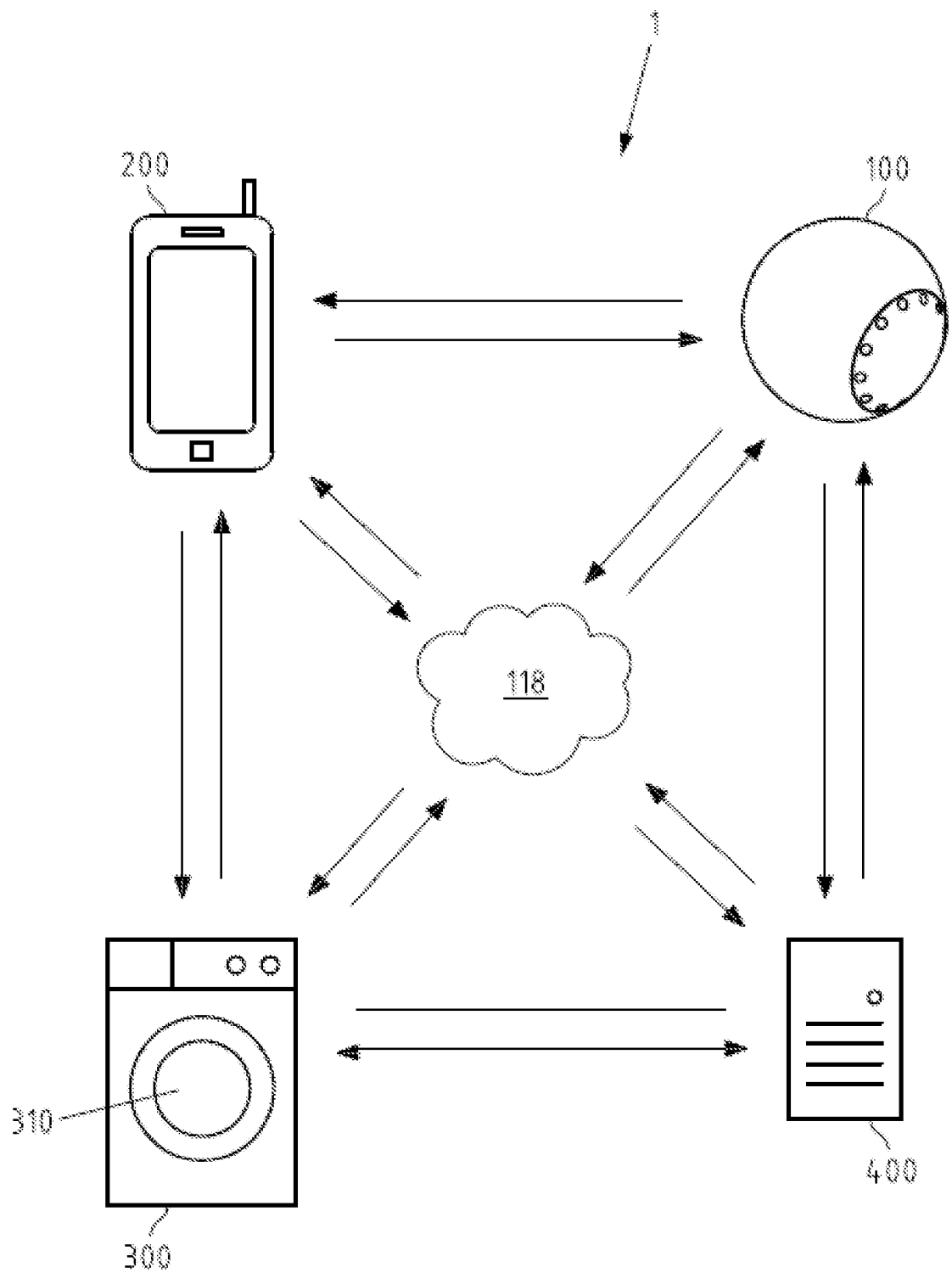
FIG. 1 shows a schematic representation of an embodiment of a system as contemplated herein.

FIG. 1 shows, first of all, a schematic representation of an embodiment of a System 1 as contemplated herein comprising the devices 100, 200, 300 and 400. System 1 is configured to execute exemplary methods as contemplated herein. Device 100 is an exemplary mobile device 100, which in this case may be placed in the treatment chamber 310 of the household appliance 300 (here exemplarily configured as a washing machine). Both the device 100 and the washing machine 300 may each be a device as contemplated herein. Furthermore, System 1 comprises as a further device mobile device 200 in the form of a smartphone, tablet, wearable, or the like (here exemplarily configured as a smartphone). Mobile device 200 may also be a device as contemplated herein or may perform individual steps of exemplary methods as contemplated herein. However, device 200 may also be a computer, a desktop computer or a portable computer, such as a laptop computer, a tablet computer, a Personal Digital Assistant (PDA). In addition or alternatively to devices 300 and 200, the system may also include a server 400. It is also conceivable that System 1 may also include fewer or more than three devices.

While the examples described here are described in particular in connection with household appliance 300 in the form of a washing machine, the explanations also apply analogously to other types of household appliances.

Each of the devices 100, 200, 300, 400 may have a communication interface to communicate and/or to exchange data with one or more of the other devices, e.g. directly via a wireless (Bluetooth, WLAN, ZigBee, NFC, to name but a few non-limiting examples) and/or wired (LAN) connection, and/or via a communication network 118, such as the Internet, and/or a local network covering the devices 100, 200, 300.

Figure 2:
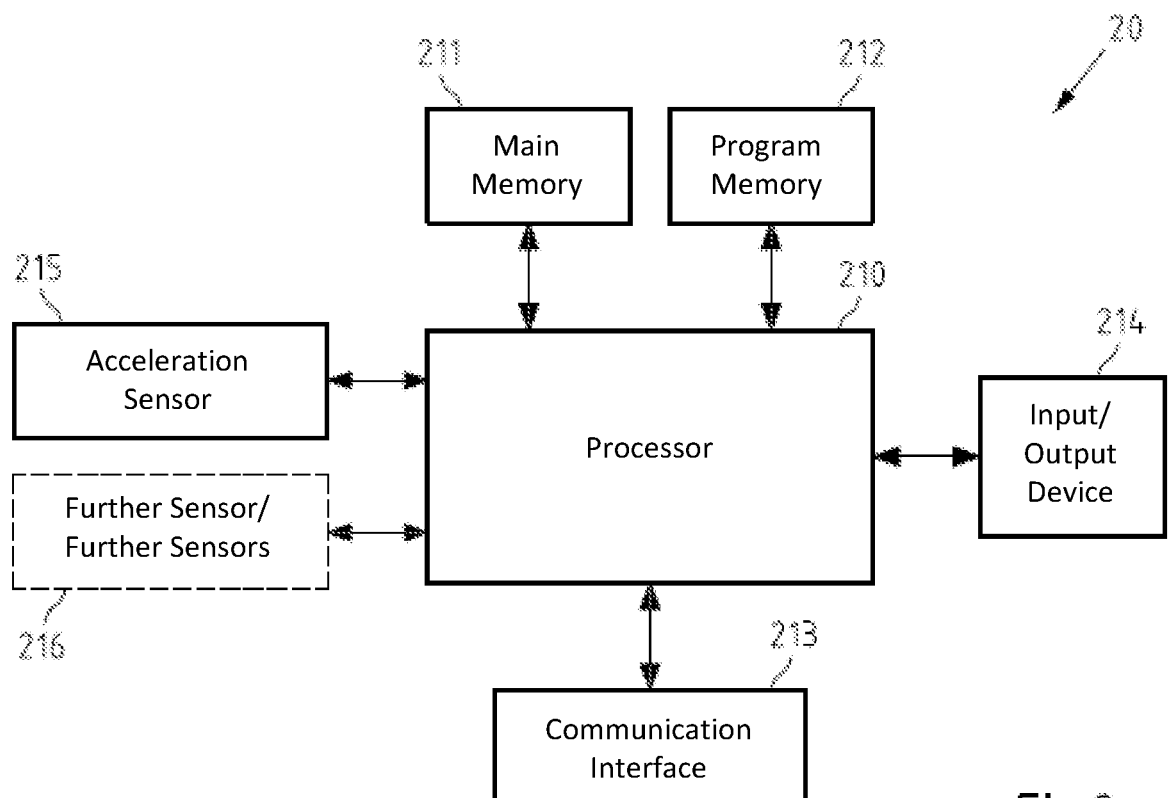
FIG. 2 shows a block diagram of an embodiment of a device as contemplated herein for carrying out an embodiment of a method as contemplated herein.

FIG. 2 shows a block diagram 20 of an embodiment of a device as contemplated herein for the execution of an embodiment of a method as contemplated herein. The block diagram 20 in FIG. 2 may be an example of either device 100, washing machine 300, mobile device 200 (or part thereof), or server 400, all shown in FIG. 1.

Processor 210 of device 20 is designed in particular as a microprocessor, micro-controller unit, micro-controller, Digital Signal Processor (DSP), Application-Specific Integrated Circuit (ASIC) or Field Programmable Gate Array (FPGA).

Processor 210 executes program instructions stored in program memory 212 and stores, for example, intermediate results or the like in the working or main memory 211. Program memory 212 is, for example, a non-volatile memory such as a flash memory, a magnetic memory, an EEPROM memory (Electrically Erasable Programmable Read-Only Memory) and/or an optical memory. Main memory 211 is, for example, a volatile or non-volatile memory, in particular a Random Access Memory (RAM) such as a Static RAM memory (SRAM), a Dynamic RAM memory (DRAM), a Ferroelectric RAM memory (FeRAM) and/or a Magnetic RAM memory (MRAM).

Program memory 212 is preferably a local data storage medium firmly connected to device 20. Data storage media permanently connected to device 20 is, for example, hard disks which are built into device 20. Alternatively, the data storage medium may, for example, also be a data storage medium that is detachably connectable to device 20.

Program memory 212 contains, for example, the operating system of device 20, which is at least partially loaded into main memory 211 when the device 20 is started and is executed by processor 210. In particular, when device 20 is started, at least part of the core of the operating system is loaded into main memory 211 and executed by processor 210.

In particular, the operating system allows the use of device 20 for data processing. For example, it manages resources such as main memory 211 and program memory 212, communication interface 213, input and output device 214, provides basic functions to other programs through programming interfaces and controls the execution of programs.

Processor 210 further controls communication interface 213, which may, for example, be a network interface and may be designed as a network card, network module and/or modem. Communication interface 213 is configured in particular to establish a connection of device 100 with other devices, in particular via a (wireless) communication system, for example a network, and to communicate with them. Communication interface 213 may, for example, receive data (via the communication system) and forward it to processor 210 and/or receive data from processor 210 and send it (via the communication system). Examples of a communication system are a local area network (LAN), a wide area network (WAN), a wireless network (e.g. according to the IEEE 802.11 standard, the Bluetooth (LE) standard and/or the NFC standard), a wired network, a mobile network, a telephone network and/or the Internet. For example, communication is possible with the Internet and/or other devices using the communication interface 213. In the case of devices 200, 300, 400, communication interface 213 may be used to communicate with the other devices 200, 300, 400 or the Internet.

Via such a communication interface 213, in particular, sensor data characterizing the condition of a treatment chamber of a household appliance (e.g. washing machine 300 according to FIG. 1) may be obtained (received). Furthermore, the displayed components (and other components, if required) may be used to control and/or regulate a household appliance (e.g. washing machine 300 according to FIG. 1) and/or the device (e.g. device 100 according to FIG. 1), taking into account the sensor data received.

Furthermore, processor 210 may control at least one input/output device 214. Input/output device 214 is, for example, a keyboard, a mouse, a display unit, a microphone, a touch-sensitive display unit, a loudspeaker, a reader, a drive and/or a camera. For example, input/output device 214 may receive input from a user and forward it to processor 210 and/or receive and output data for the user from processor 210.

Finally, device 20 may include at least one acceleration sensor 215, and optionally one or more additional sensors 216. One of the one or more further sensors is, for example, a GPS module, in order to acquire in this way, location data of the corresponding device. A further example of a further sensor 216 is a temperature sensor, a conductivity sensor, and/or an optical sensor, in order to obtain temperature data, conductivity data, and/or optical data.

Figure 3:
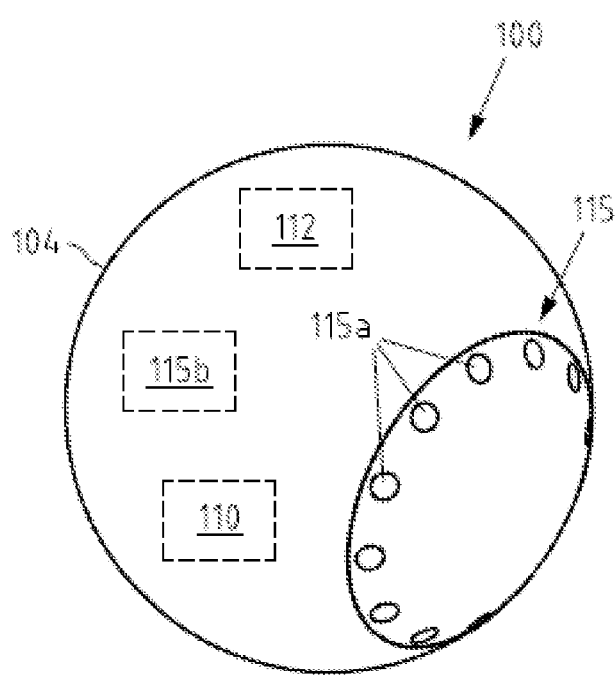
FIG. 3 shows a schematic representation of device 100 shown in FIG. 1 in perspective view.

FIG. 3 now shows a schematic representation of the device 100 according to FIG. 1 in perspective view. Device 100 is a separate device from the washing machine 300. Device 100 has an essentially spherical, watertight casing, which is at least partially made of a non-rigid or elastic material. Device 100 includes, for example, a supply of detergent or individual detergent components to be combined as required (not shown). The detergent or the individual detergent components may be dispensed into the interior (the treatment chamber 310) of washing machine 300 by employing pump unit 115 via the outlet openings 115a during the operation of washing machine 300. This is because device 100 is designed to be placed in the washing drum of washing machine 300 and to be freely mixed with the laundry in it.

Device 100 may also be designed to send control signals to washing machine 300 for control and/or regulation, for example to influence the program sequence of the washing machine.

Device 100 has a casing 104, whereby the casing 104 is designed to be placed in a treatment chamber 310 of a household appliance 300. In FIG. 1, the devices are not shown to scale, in particular casing 104 or device 100 is of a size that allows casing 104 or device 100 to be inserted and removed into and from treatment chamber 310.

Casing 104 of device 100 has an output module 110 which is designed to dispense at least one preparation into treatment chamber 310 of household appliance 300 and/or to trigger an output. For example, the preparation is dispensed through an output opening of output module 110 and/or a storage container to the surroundings of output module 110 and/or the storage container and thus reaches in particular treatment chamber 310.

Casing 104 of appliance 100 comprises a sensor module 112 which is configured to determine sensor data characteristic of the condition of treatment chamber 310 of household appliance 300 and/or appliance 100, for example, at least one parameter of a movement (in particular speed and/or acceleration, in particular of appliance 100 and/or casing 104 and/or treatment chamber 310) by the acceleration sensor 115*b*. The acceleration sensor 115*b* may be included in and/or electrically connected to sensor module 112. The acceleration sensor 115*b* must at least be included in device 100.

Device 100 is in wireless communication with household appliance 300, for example via communication network 118. Further devices may be integrated into the communication, for example a server (e.g. server 400 according to FIG. 1), which in particular controls and/or regulates individual or several method steps of the treatment in household appliance 300.

For example, a cleaning program is monitored at least partially based on sensor data acquired by sensor module 112. In particular, the cleaning program is controlled and/or influenced at least partially on the basis of the sensor data. The cleaning program may, for example, include initiating the dispensing of a preparation by the output module, in particular via a storage container. For example, a washing and/or cleaning agent is output depending on the sensor data.

To save electrical energy or the capacity of an energy storage device (not shown in FIG. 3), output module 110 and/or sensor module 112 may be configured to communicate with household appliance 300 at least based on the sensor data acquired by sensor module 112. Furthermore, output module 110 may be configured to carry out the dispensing and/or effecting of the output of a preparation by output module 110 at least based on the sensor data acquired by sensor module 112. For example, communication and/or output are only carried out if the movement of treatment chamber 310 and/or device 100 (for example the acceleration and/or speed) are within respective permissible ranges. This may, for example, be carried out via reference values stored in a database (e.g. included by or connected to server 400 according to FIG. 1). Communication and/or output may be prevented if, for example, the respective parameters are outside the permissible ranges, which may be defined by reference values.

The following exemplary embodiments according to all aspects of the present disclosure shall also be understood as disclosed.

Figure 4A:
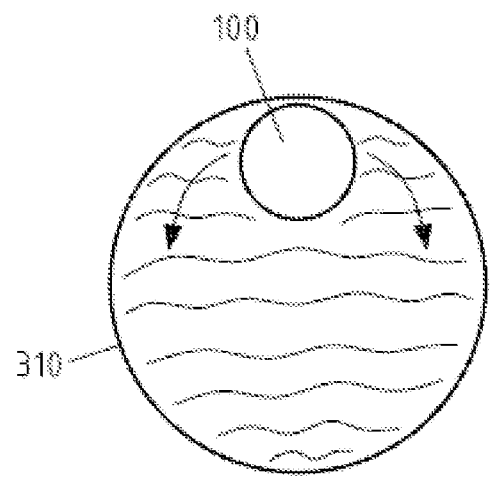
FIG. 4a shows a device 100 (e.g. device 100 according to FIG. 1) schematically in a state placed in a treatment chamber 310 (e.g. a drum) of a household appliance (e.g. household appliance 300 according to FIG. 1)
Figure 4B:
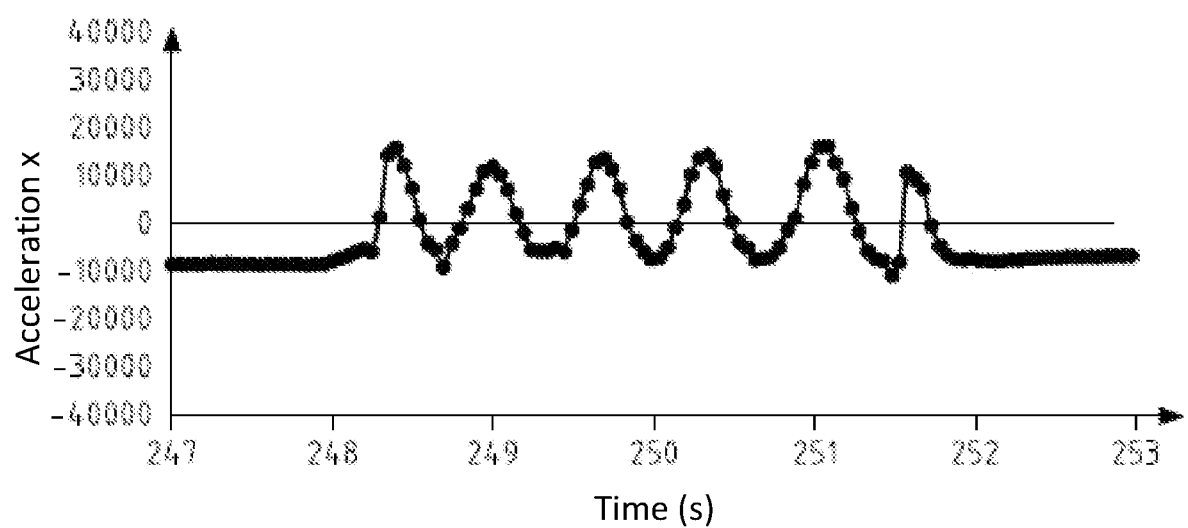
FIG. 4b shows sensor data determined by an acceleration sensor, e.g. comprised by a device 100 according to FIG. 1, which in this case represents an acceleration curve.

FIG. 4*a* shows a device 100 (e.g. device 100 according to FIG. 1) schematically in a condition placed in a treatment chamber 310 (e.g. a drum) of a household appliance (e.g. household appliance 300 according to FIG. 1). Household appliance 300 is designed as a washing machine. The treatment chamber 310 of the washing machine is loaded to its full capacity (corresponds to 100% load). This is shown schematically by the curved and horizontally extending lines in treatment chamber 310. An acceleration sensor (e.g. acceleration sensor 115*b*) surrounded by the device 100 is activated when it detects a change in the movement behavior according to its sensitivity. This is the case as soon as the drum of the treatment chamber 310 rotates, regardless of whether it is used to determine the weight or to distribute the incoming water. In this load situation, however, the device 100 cannot or can only move very little in all spatial directions. It is quasi blocked and rotates with the frequency of the drum. This condition is maintained even during the so-called wetting phase of a cleaning program carried out by household appliance 300—corresponding to the water intake. This may, for example, result in a very characteristic curve of sensor data determined by the acceleration sensor 115*b*, which in this case represents an acceleration curve over time. This is shown in FIG. 4*b*. The curve essentially corresponds to a harmonic sinusoidal oscillation corresponding to the rotational movement of the drum. Accordingly, such a determined acceleration curve is indicative for a fully loaded drum, if, for example, it is determined during water intake.

Figure 5A:
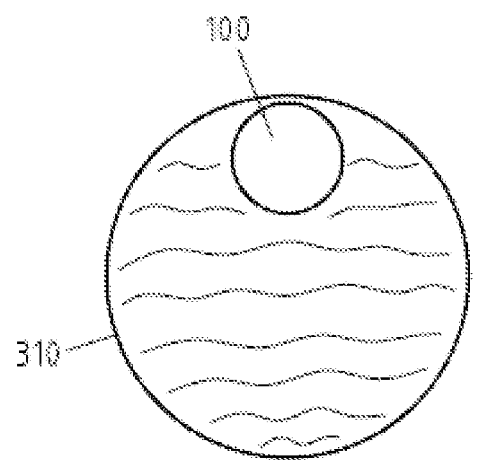
FIG. 5a shows a device 100 (e.g. device 100 according to FIG. 1) schematically in a condition placed in a treatment chamber 310 (e.g. a drum) of a household appliance (e.g. household appliance 300 according to FIG. 1) prior to a wetting phase of a cleaning program to be performed by the household appliance.
Figure 5B:
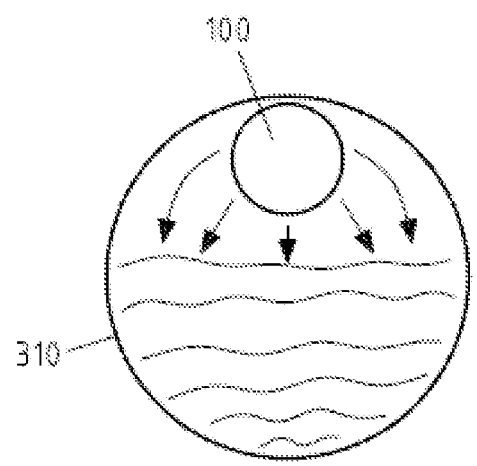
FIG. 5b shows a device 100 (e.g. device 100 according to FIG. 1) schematically in a condition placed in a treatment chamber 310 (e.g. a drum) of a household appliance (e.g. household appliance 300 according to FIG. 1) after or during a wetting phase of a cleaning program to be carried out by the household appliance.
Figure 5C:
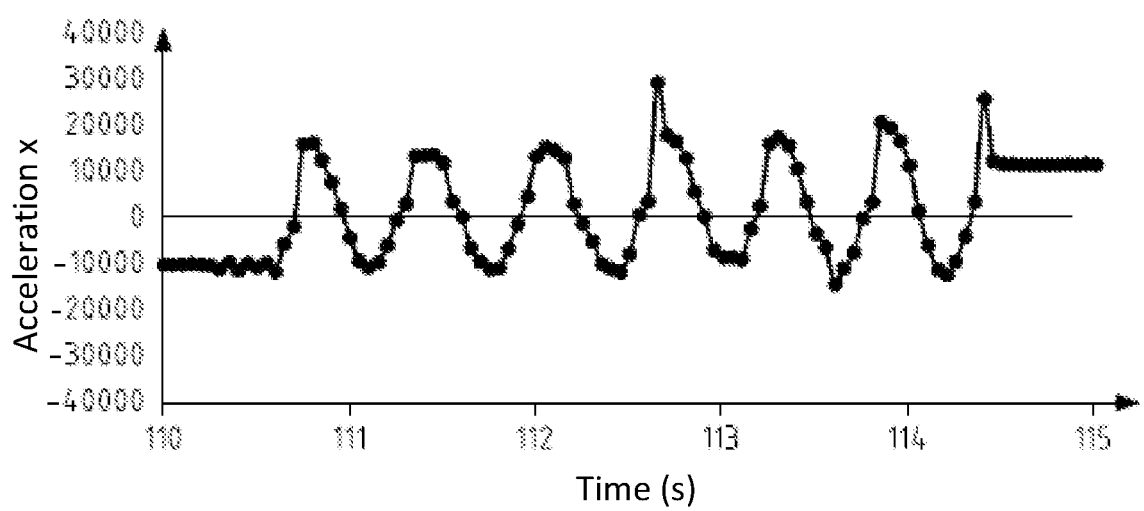
FIG. 5c shows sensor data acquired by an acceleration sensor, e.g. comprised by a device 100 as shown in FIG. 1, which in this case represents an acceleration curve.

FIGS. 5*a* and 5*b* each show a device 100 (e.g. device 100 according to FIG. 1) schematically in a condition placed in a treatment chamber 310 (e.g. a drum) of a household appliance (e.g. household appliance 300 according to FIG. 1). Household appliance 300 is designed as a washing machine. The treatment chamber 310 of the washing machine is filled in such a way that the treatment chamber 310 appears full to a user. This is shown schematically by the indicated curved and horizontally extending lines in treatment chamber 310. The drum is therefore only apparently filled to its full capacity. The drum is not filled to the extent that objects to be cleaned, e.g. laundry, have been stuffed into the drum. At the beginning of a cleaning program, the device 100 moves only slightly, corresponding to a limited free space. This is shown in FIG. 5*a*. The acceleration curve represented by sensor data acquired by an acceleration sensor (e.g. acceleration sensor 115*b*) included in the device 100, or the curve of the acceleration curve corresponds to that of a harmonic sine wave (see FIG. 5*c*, see also FIG. 4*b*). With increasing water intake, the laundry collapses somewhat and new free space is created in the drum. Now device 100 can move freely in this newly freed space and no longer exclusively follows the movement of the drum (see FIG. 5*b*). The course of the sine curve is disturbed and finally disharmonious (see FIG. 5*d*).

Such behavior is typical, for example, for a partially loaded drum. In this case it is therefore important not only to observe the curve behavior as such, but also to evaluate the change in curve behavior over time. For this purpose, certain analysis methods are suitable, for example, those based on graphic and/or mathematical principles. For example, a function representing the curve progression may be examined for its zero points and/or the distance of the zero points from each other. For example, a disharmonic function constantly changes the distance between its zeros. Another possibility for examining for disharmony is, for example, the determination of amplitude maxima (+) or amplitude minima (−). Here, for example, the solution of the equation should ideally be identical.

Figure 5D:
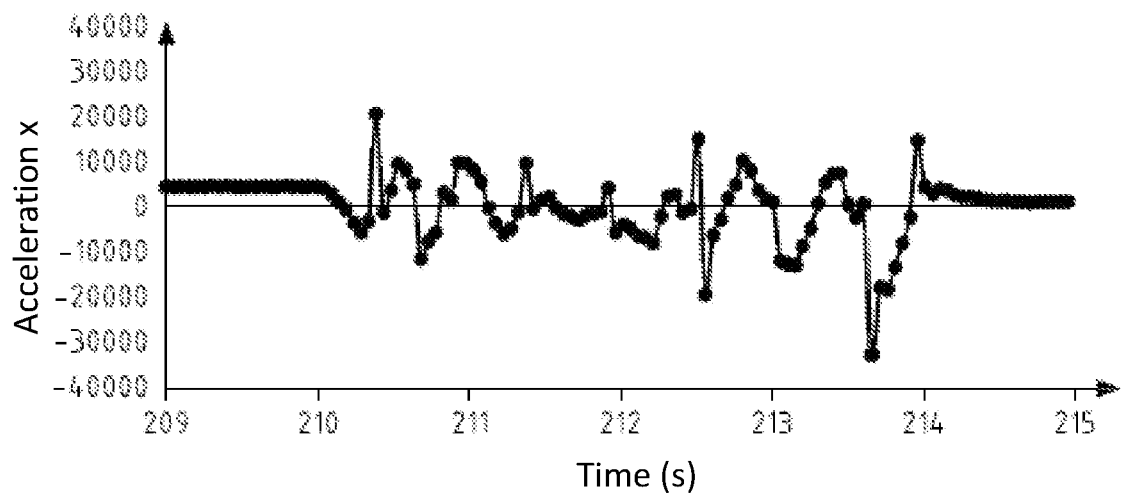
FIG. 5d shows further sensor data acquired by an acceleration sensor, e.g. comprising sensor data acquired by a device 100 according to FIG. 1, which in the present case represents an acceleration curve.

If, for example, a curve shown in FIG. 5*d* is determined, e.g. during a water intake process as part of a cleaning program to be carried out, it may be assumed, for example, that the treatment chamber 310 of the household appliance 300 has an average load.

Figure 6A:
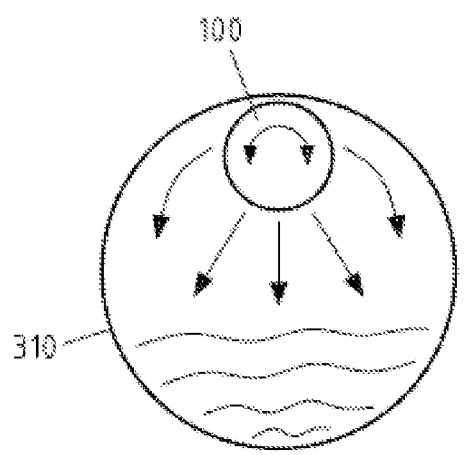
FIG. 6a shows a device 100 (e.g. device 100 according to FIG. 1) schematically in a condition placed in a treatment chamber 310 (e.g. a drum) of a household appliance (e.g. household appliance 300 according to FIG. 1)
Figure 6B:
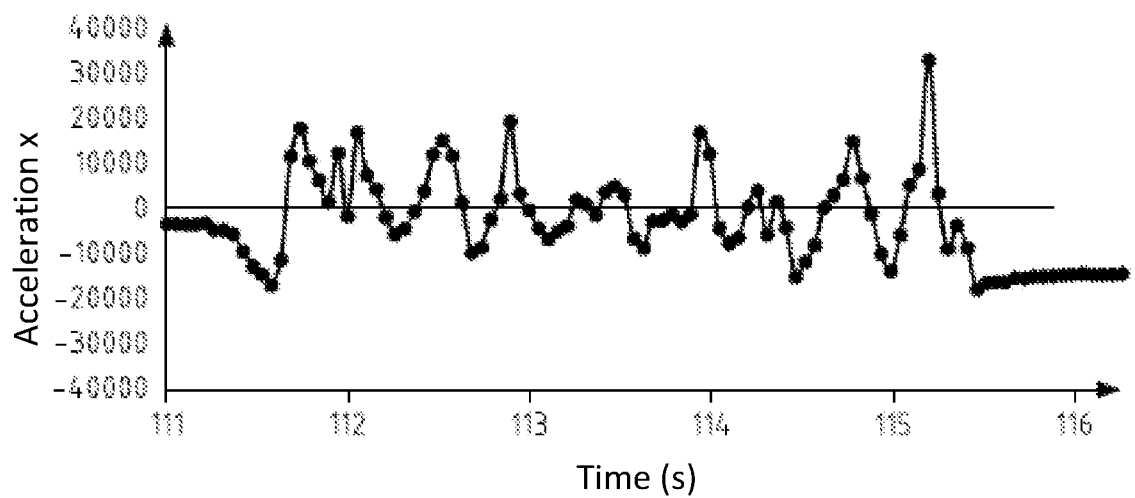
FIG. 6b shows a further item of sensor information determined by an acceleration sensor, e.g. included in a device 100 according to FIG. 1, which in this case represents an acceleration curve.

FIG. 6*a* shows a device 100 (e.g. device 100 according to FIG. 1) schematically in a condition placed in a treatment chamber 310 (e.g. a drum) of a household appliance (e.g. household appliance 300 according to FIG. 1). The household appliance 300 is designed as a washing machine. The treatment chamber 310 of the washing machine is filled in such a way that only a small quantity of items (e.g. laundry) is placed in the treatment chamber. This is shown schematically by the indicated curved and horizontally extending lines in treatment chamber 310. From the beginning device 100 can move freely in the treatment chamber 310 (the drum). Only when the centrifugal forces, e.g. caused by rotation of the drum from the washing machine, hold the device 100 in position, does a corresponding acceleration curve (see description above) represent a rudimentary sinusoidal acceleration curve. Typically, however, the curve is disharmonic from the start (see FIG. 6b). In contrast to the examples shown in FIGS. 4a, b and 5a to c, FIG. 6b shows that at no point in the water intake process of a cleaning program to be carried out does a harmonic acceleration behavior occur (e.g. represented by a course of the acceleration curve corresponding to a harmonic sinusoidal oscillation). If a clear disharmonic acceleration behavior is determined at the beginning, it must be assumed that the treatment chamber 310 is loaded with a relatively small amount of water.

In a further exemplary embodiment according to all aspects, the device is designed or configured, for example, to determine sensor data determined during a water intake phase of a cleaning program to be carried out by the household appliance 300 (e.g. recorded by the acceleration sensor (e.g. an acceleration sensor 115b)) as a basis for determining a weight data indicative of a quantity of objects placed in the treatment chamber 115b of the household appliance 300. At least partially based on the determined weight data, quantity data indicative of a quantity of detergent to be dosed may be determined. For example, a predetermined matrix comprising detergent quantities associated with different weight data may be used to determine the detergent quantity. Furthermore, for example, in a step following the determination of the detergent quantity, it may be determined whether or not the water intake of the cleaning program to be performed has ended and/or whether or not the actual cleaning process (e.g. washing process) has started. This may, for example, be carried out on a (further) evaluation of the sensor data representing the acceleration curve.

Figure 7A:
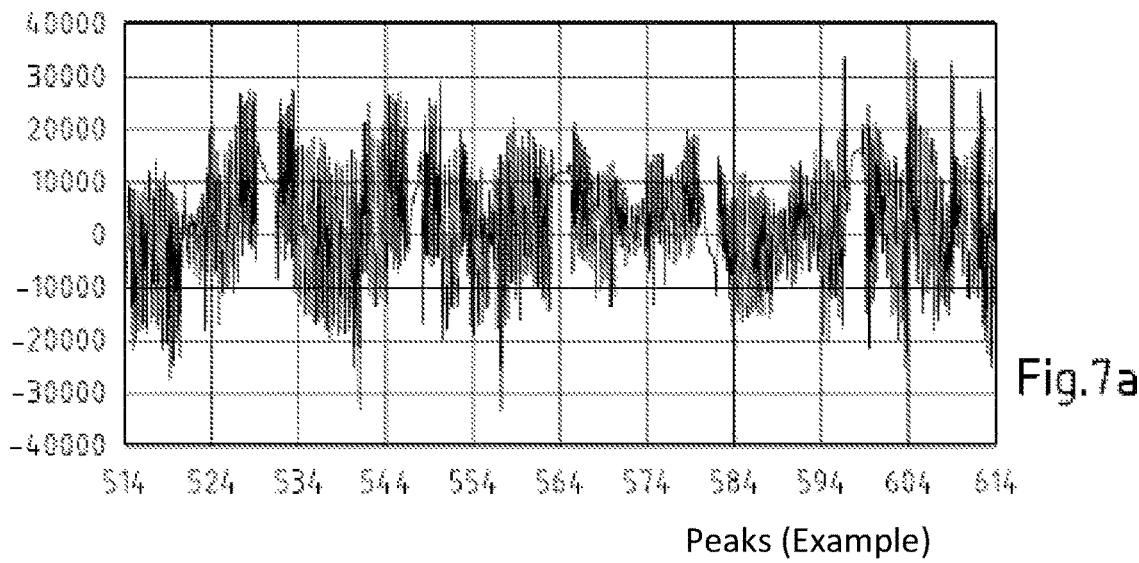
FIG. 7a shows such a curve for a full load of the treatment chamber of a household appliance.
Figure 7B:
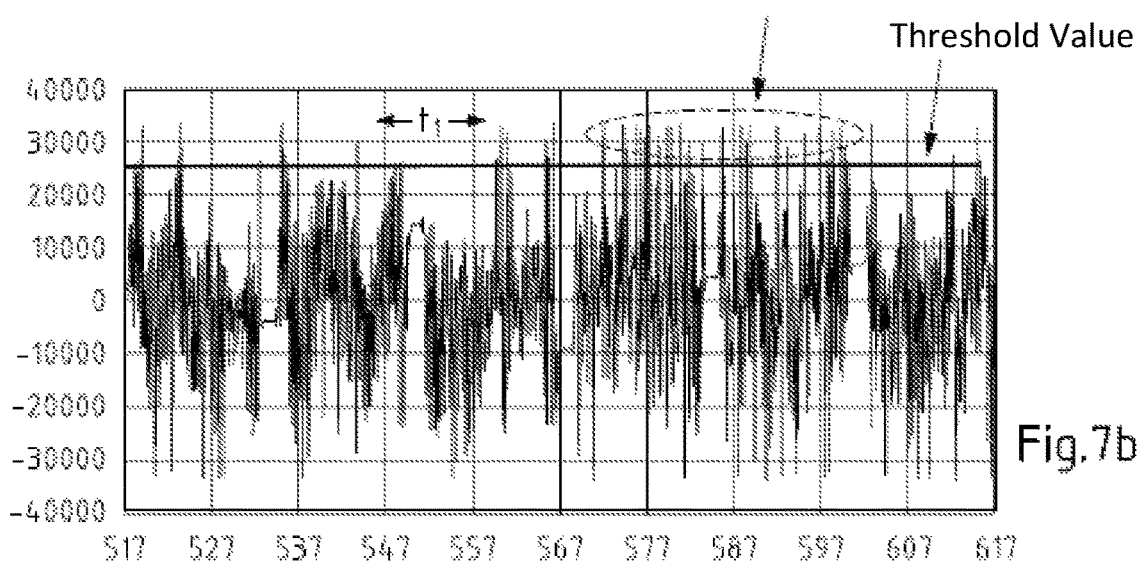
FIG. 7b shows such a curve for an average load of the treatment chamber of a household appliance.
Figure 7C:
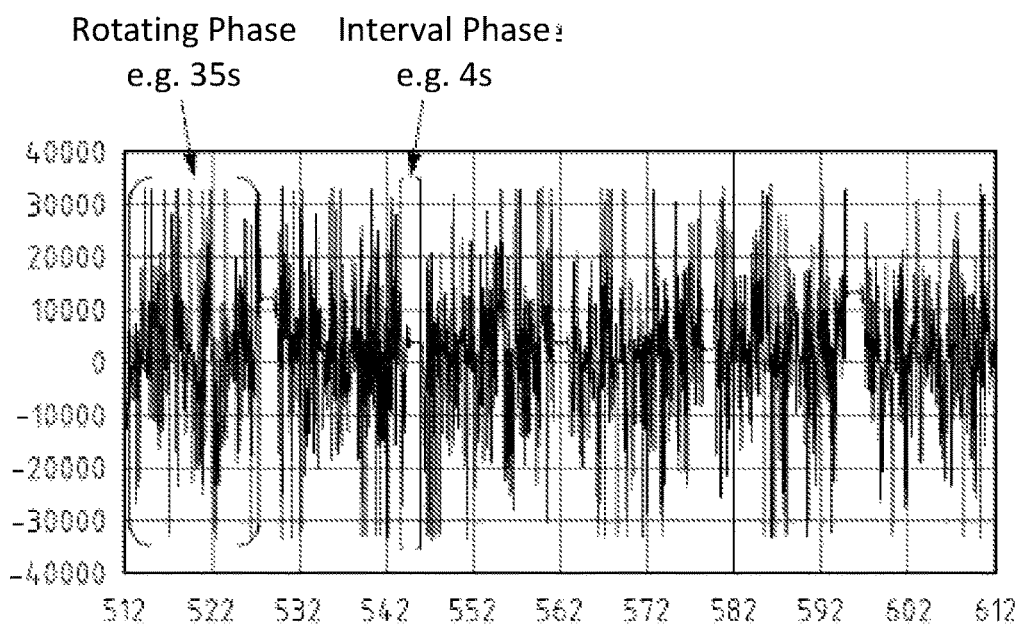
FIG. 7c shows such a curve for a small load in the treatment chamber of a household appliance.

FIG. 7a shows such a curve for a full load of the treatment chamber (e.g. treatment chamber 310 according to FIG. 1) of a household appliance (e.g. household appliance 300 according to FIG. 1). FIG. 7b shows such a curve for an average load of the treatment chamber 310 of a household appliance 300. FIG. 7c shows such a curve for a small load of the treatment chamber 310 of a household appliance 300.

This results in movement patterns exemplified by regular movement phases (=rotation of the drum) and pause phases. This movement pattern is evaluated by the appliance (e.g. appliance 100 according to FIG. 1) after passing through the water intake phase. If such a regular pattern is detected several times (with n patterns≥3), the device 100 interprets this as a washing process and the device 100 doses a first detergent (e.g. portion of detergent) e.g. from its storage container. The detergent portion may be divided into further sub portions. The dosing may also be controlled by further parameters, e.g. a detected temperature rise, e.g. represented by the sensor data.

In the event that the load detection has not been carried out in the steps described above, device 100 determines weight data indicative of a quantity of items placed in the treatment chamber 310 of the household appliance 300, e.g. by a further detection algorithm in which it evaluates the number of peak maxima (amplitude maxima) above a threshold value over a period t1 (cf. FIG. 7b). The number of peak maxima correlates inversely with the load quantity. This means that the more peak maxima are detected, the smaller the load. By introducing limit values, load ranges, for example, "average load", may also be defined here.

In a second embodiment, the device may provide feedback to the process via a non-wired connection, for example to a communication device. This may be immediate or delayed. A feedback may, for example, be a confirmation of the load detection or an indication of the load quantity (e.g. the weight of laundry). Likewise, dosage confirmations or dosage quantities of detergent stocked by the device may also be reported. By employing bidirectional communication, the user may, for example, via a voice-controlled system, confirm the feedback or make corrections to the dosing process.

In a further embodiment according to all aspects, a (dosing) system comprises the electromechanical system itself and an API (Application Programming Interface). The API is used for universal multi-directional connection of other software systems to the software of the device. The active use of the API by other software, for example one for the operation, monitoring and control of a household appliance (e.g. a washing machine), sometimes considerably extends the functionality of the system. In addition to the mutual exchange of pure data, control commands may also be transmitted in one direction as well as in the other. This makes it possible, for example, for the device to take over the control of a household appliance designed as a washing machine and to make adjustments to the cleaning program, e.g. time adjustments depending on the load quantity of the treatment chamber of the household appliance. This may be advantageous if a user starts a standard program with normal running time, which is actually intended for full loads, but the appliance has only detected a partial load. However, partial load does not require the full running time due to the higher mechanical input. It may therefore be shortened, and the user gets his laundry back in less time. Conversely, if, for example, the user starts a program with a short running time, but the load is too big, the device may extend the running time and thus ensure that the laundry is still clean. In addition to influencing the running time, the device may also simply respond by changing the amount of detergent (e.g. detergent quantities) according to a dosing matrix stored in a database, corresponding to the load quantities. It is advisable to store such a dosing matrix locally in a memory contained in the device, since during the cleaning (or washing process) it cannot always be ensured that the device can establish and/or maintain contact with a local or external server via communication, e.g. by employing the communication interface contained in the device (e.g. WLAN, BLE, LPWAN, Sub GHz, etc.).

The exemplary embodiments of the present disclosure described in this specification and the optional features and properties mentioned in each case should also be understood as disclosed in all combinations. In particular, unless explicitly stated otherwise, the description of a feature included in an example of an embodiment shall not be understood in the present case to mean that the feature is indispensable or essential for the function of the example. The sequence of the method steps described in this specification in the individual flowcharts is not mandatory; alternative sequences of the method steps are conceivable. The method steps can be implemented in various ways, for example, implementation in software (through program instructions), hardware or a combination of both to implement the method steps is conceivable.

Terms used in the Claims such as "comprising", "having", "containing", "containing" and the like do not exclude further elements or steps. The expression "at least partially" covers both the "partially" case and the "completely" case. The wording "and/or" should be understood to mean that both the alternative and the combination should be disclosed, i.e. "A and/or B" means "(A) or (B) or (A and B)". The use of the indefinite article does not exclude a plural. A single device may perform the functions of several units or devices mentioned in the Claims. Reference marks indicated in the Claims should not be regarded as limitations of the features and steps used.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

The invention claimed is:

1. A device for use in a household appliance, the device comprising:
    at least one casing configured to be placed in a treatment chamber of the household appliance, the casing comprising:
        at least one output module configured to dispense at least one preparation into the treatment chamber of the household appliance and/or to trigger an output of the at least one preparation into the treatment chamber; and
        at least one sensor module configured to detect sensor data characteristic of a condition of the treatment chamber of the household appliance and/or the device, wherein the at least one sensor module comprises at least one acceleration sensor,
    wherein the sensor data at least partially represents data detected by the at least one acceleration sensor,
    wherein the data detected by the at least one acceleration sensor at least partially represents a course of a measured acceleration over a predetermined time,
    wherein the dispensing and/or triggering the output of the at least one preparation into the treatment chamber by the at least one output module is at least partially based on the data detected by the at least one acceleration sensor, and
    wherein:
        the data detected by the at least one acceleration sensor (i) is at least partially indicative of a load condition of the treatment chamber of the household appliance and (ii) represents a mapped curve of a measured acceleration over a predetermined time,
        a controller is configured to determine the load condition of the treatment chamber by an analysis of the mapped curve, and
        a harmonic sinusoidal oscillation in the mapped curve is recognized, by the output module, as being indicative of a fully loaded drum and a disharmonic sinusoidal oscillation in the mapped curve is recognized, by the output module, as being indicative of a partially loaded drum.

2. The device according to claim 1, wherein the data detected by the at least one acceleration sensor is at least partially indicative of a status of a cleaning program performed by the household appliance.

3. The device according to claim 1, wherein the data detected by the at least one acceleration sensor is at least partially indicative of a movement of the device.

4. The device according to claim 1, wherein the at least one output module and/or the at least one sensor module is configured to communicate with the household appliance.

5. The device according to claim 4, wherein the at least one output module and/or the at least one sensor module is arranged to perform and/or prevent communication with the household appliance at least based on the sensor data detected by the at least one sensor module.

6. The device according to claim 5, wherein the communication with the household appliance comprises communicating feedback data, wherein the feedback data is indicative of feedback to the household appliance regarding at least one parameter characterizing the treatment chamber of the household appliance.

7. The device according to claim 1, wherein the at least one output module and/or the at least one sensor module is configured to perform communication with at least one server.

8. The device according to claim 7, wherein a user profile may be generated at least partially based on feedback data, wherein the user profile comprises one or more items of information specifying the user.

9. The device according to claim 1, wherein the sensor data is at least partially used to determine whether or not the device is placed in the treatment chamber of the household appliance.

10. The device according to claim 1, wherein a temperature range provided for the treatment chamber of the household appliance during a treatment is from about 20° C. to about 150° C.

11. The device according to claim 1, wherein the at least one output module is configured to perform and/or prevent dispensing and/or causing the output of a preparation by the at least one output module at least based on the sensor data determined by the at least one sensor module.

12. A system comprising the device of claim 1, and at least one household appliance.

13. The device according to claim 4, wherein the at least one output module and/or the at least one sensor module is configured to communicate wirelessly with the household appliance.

14. The device according to claim 7, wherein the communication is configured to transmit feedback data.

15. The device according to claim 10, wherein the temperature range provided for the treatment chamber of the household appliance during a treatment is from about 30° C. to about 60° C.

* * * * *